March 31, 1953      M. A. WINTER      2,633,036
VARIABLE CONTOUR CAM

Filed Feb. 10, 1951      2 SHEETS—SHEET 1

INVENTOR.
MAHLON A. WINTER,
BY Martin C. Hogan Jr.
ATTORNEY

March 31, 1953 M. A. WINTER 2,633,036
VARIABLE CONTOUR CAM
Filed Feb. 10, 1951 2 SHEETS—SHEET 2

INVENTOR
MAHLON A. WINTER,
BY
ATTORNEY

Patented Mar. 31, 1953

2,633,036

UNITED STATES PATENT OFFICE 2,633,036

VARIABLE CONTOUR CAM

Mahlon A. Winter, Baltimore, Md., assignor to The Glenn L. Martin Company, Middle River, Md., a corporation of Maryland Application February 10, 1951, Serial No. 210,353

2 Claims. (Cl. 74—568)

This invention relates to an improved variable contour cam, especially adapted for use where accurate control of the contour is essential.

In the use of forming apparatus of the type having a rubber head acting as the forming medium, it has been found that for wrinkleless forming, it is essential that a very close control over the pressure in the forming head be maintained. Since the pressure at any time must be regulated in accordance with the progress of the forming and, since each different shaped part requires a different pressure curve, it is desirable to provide a variable contour cam which can be readily and accurately adjusted so as to control the pressure according to any predetermined pattern desired.

It is an object of this invention to provide such a variable contour cam which is especially adapted for such use.

It is a further object to provide a variable cam wherein the cam contour is defined by a flexible strip so supported at spaced points therealong that it may be caused to conform to a desired shape and which will, when once adjusted, accurately maintain the desired contour.

Another object is to provide such a cam wherein the contour may be readily changed at any time without requiring the use of special tools.

Another object is to provide a variable contour cam construction which is built up primarily from a plurality of identical elements which may be rigidly fastened together in any desired numbers so as to provide a cam of any desired cam length.

Further and other objects will become apparent after consideration of the following description and claims, in view of the accompanying drawings.

Figure 1:
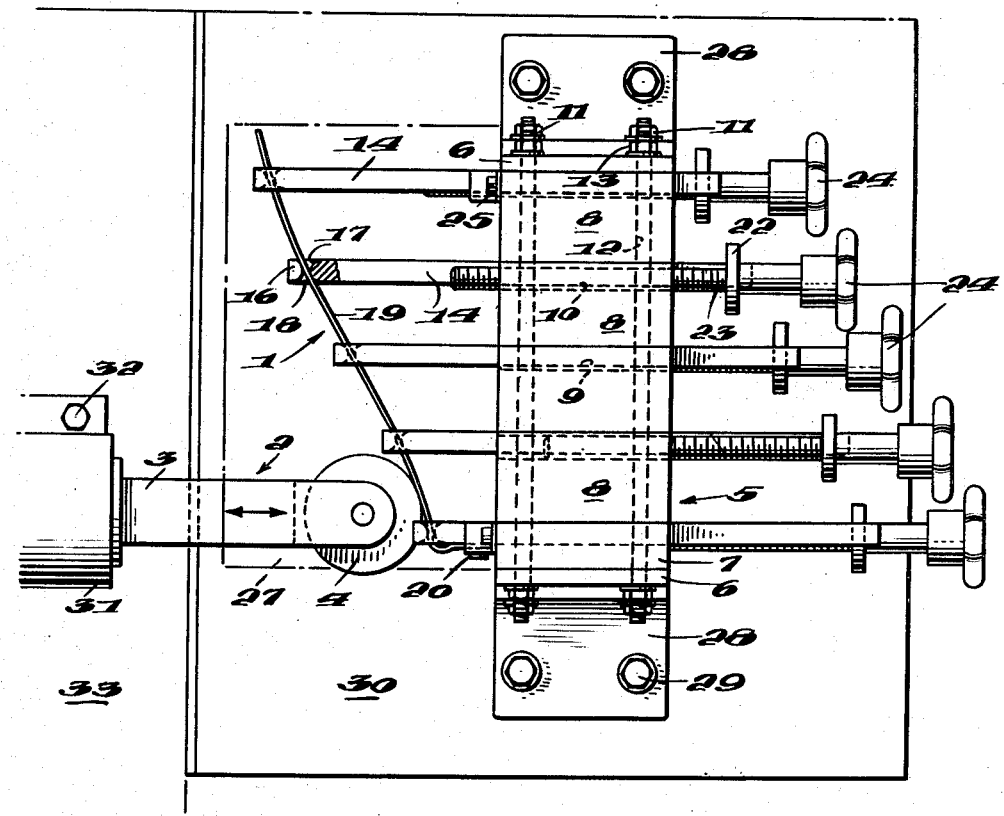
Figure 1 is a side elevation view of a portion of a forming machine showing the cam of this invention and its associated follower applied thereto.
Figure 3:
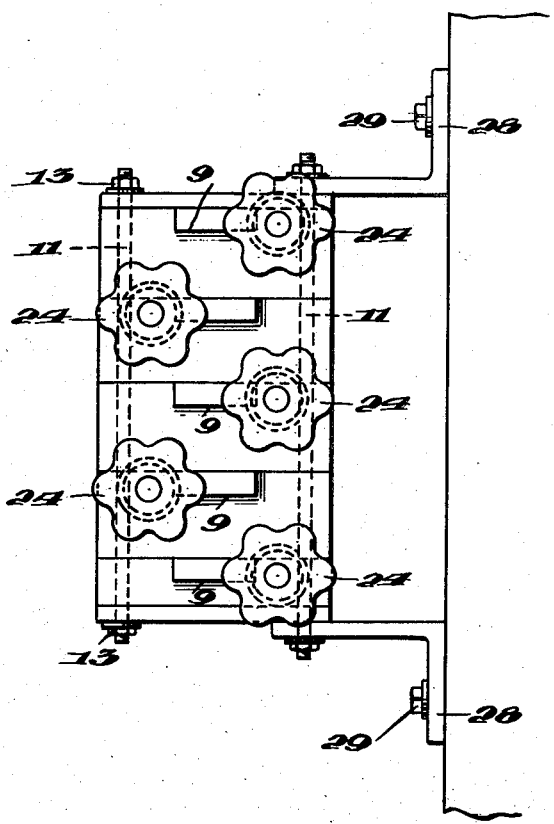
Figure 3 is an end view thereof.

Referring first to Figure 1, the improved cam is shown in its entirety at 1, arranged to coact with a follower 2 consisting of a rod 3 carrying at its outer end a roll 4 which is adapted to follow the contour of the cam. The cam comprises a main body or supporting member 5 which is built up from a pair of end plates 6, a bottom block 7 and a plurality of intermediate blocks 8, stacked one upon the other as clearly indicated in Figures 1 and 3. Each of the blocks 7 and 8 is provided with a rectangular slide way 9 formed in its upper surface and with a threaded bore 10 extending therethrough substantially parallel to the slide way. It should be noted that the blocks 8 are identical to one another and, when stacked together, are alternately reversely arranged so that the bores 10 of adjacent blocks lie on opposite sides of the slide ways 9. Blocks 7 and 8 are rigidly secured together between end plates 6 by means of threaded rods 11 extending through suitable mating bores 12 therein, nuts 13 being applied to the rods 11 to rigidly clamp the parts together.

Figure 2:
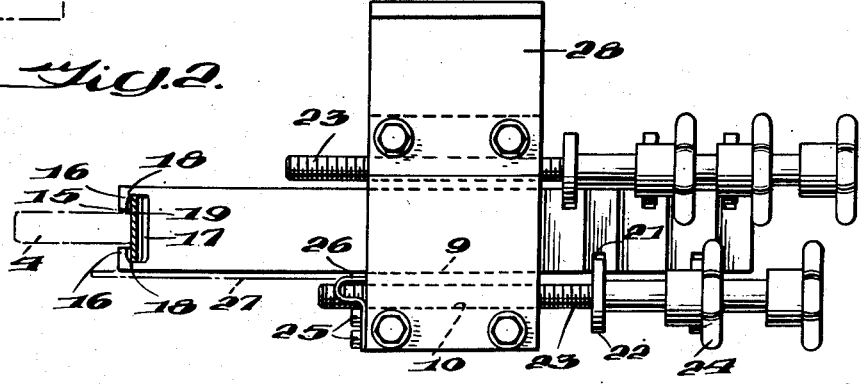
Figure 2 is a top plan view of the cam.

Adapted to slide within each of the slide ways 9 is an elongated rectangular slide or supporting arm 14, the outer end of which is formed with a generally T-shaped channel-like slot 15 extending therethrough as shown in Figures 1 and 2. A contour forming strip 19 of flexible, resilient material such as spring steel, has one end secured rigidly to the lowermost slide 14 and extends through the slots 15 as clearly shown in Figures 1 and 2. Both the bottom wall 17 of the slot and the opposed surfaces 18 of the overhanging, inwardly extending legs 16, which define the outer wall of the slot, are convexly curved about axes generally parallel to the width-wise dimensions of said strip as shown in Figure 1. The arrangement is such that the curved surfaces 17 and 18 serve to positively position the strip 19 while at the same time permitting a considerable latitude of angular adjustment of the strip relative to the member 14. As is illustrated in Figure 2, roller 4 is adapted to ride upon the outer surface of strip 19 and is of such width as to pass freely between the laterally spaced ends of the inwardly extending legs 16.

The rear end of each of the slides is notched as at 21 to closely embrace an annular flange 22 formed on a screw shaft 23 threaded into the associated bore 10. Each of the screw shafts is provided with a suitable hand wheel 24 by which it may be manually rotated. Obviously, by screwing in or out on the associated screw shaft 23, any particular slide 14 may be adjusted as to its degree of projection from the main support 5 so as to provide the desired contour of the strip 19. Where, as is frequently true in conjunction with a forming machine, it is desirable to be able to reset the cam to any particular contour, spring clips 26 may be attached as at 25 to the body 5 adjacent the upper and lower slides 14 for temporarily supporting a suitable template, having the desired contour scribed thereon, against the slides as indicated in dotted lines at 27.

As illustrated, the cam 1 is attached by suitable brackets 28 and bolts 29 to the vertically movable, fluid-supported cushion 30 of a forming press while the follower rod 3 consists of the axially movable control plunger of a variable pressure control valve 31, attached as at 32 to a relatively stationary portion 33 of the press. Thus, the setting of the pressure control valve will be automatically controlled in a predetermined fashion in accordance with the vertical position of the press cushion at any particular stage in the forming.

The cam may be readily built up to any desired length to suit any particular range of movement. For example, if it is desired to provide a longer cam than that shown, it is merely necessary to stack the required additional number of blocks 8 needed to give the greater length and to provide the corresponding number of additional slides and hand screws. The only parts that would require changing would be the flexible strip 19 and the rods 11 which, of course, would need to be of correspondingly greater length. By making each of the blocks 8 identical with the others, and by forming the slide ways in the upper surface thereof, it is possible to produce the parts relatively inexpensively while at the same time producing a structure which will rigidly support the flexible strip under all conditions. As is clear from Figure 3, the undersurface of any particular block serves as the upper wall of the slide way for the next lower block so that the individual slides or supports 14 are firmly constrained against any but lateral sliding movement. Similarly the fact that the adjusting screws and slides are all similar and interchangeable with one another contributes materially to the convenience as well as the relatively low cost of the cam construction. Also by forming the blocks as shown so that they may be alternately reversed in building up the cam, it is possible to provide a relatively large number of closely spaced supports for the strip 19 without any interference between the hand wheels used for adjusting the supports, even though the diameter of the hand wheels is greater than the thickness of the blocks.

While but one form of the invention has been shown and described in detail, many changes and modifications will be apparent to those skilled in the art and may be made without departing from the scope of this invention as defined in the appended claims.

I claim as my invention:

1. A variable contour cam construction comprising a plurality of identical blocks of predetermined thickness, each having a channel extending medially across one face thereof and a bore extending through said block substantially parallel to and laterally offset from said channel, means rigidly clamping said blocks together in stacked relationship with one another with the channels symmetrically positioned and parallel to one another, a plurality of slides, one traversing each of said channels and projecting outwardly from the associated block, a flexible resilient contour-forming strip conjointly supported by said slides adjacent the outer end thereof, and individual slide adjusting means mounted in each of said bores and operatively engaging the associated slide for regulating the projection thereof from said block, said blocks being alternately reversely arranged so that the bores in adjacent blocks are located at opposite sides of their associated channels, whereby to prevent interference between said adjusting means.

2. A variable contour cam construction comprising a plurality of identical blocks of predetermined thickness, each having a channel extending medially across one face thereof and a bore extending through said block substantially parallel to and laterally offset from said channel, means rigidly clamping said blocks together in stacked relationship with another with the channels symmetrically positioned and parallel to one another, a plurality of slides, one traversing each of said channels and projecting outwardly from the associated block, a flexible resilient contour-forming strip conjointly supported by said slides adjacent the outer end thereof, and individual slide adjusting means mounted in each of said bores and operatively engaging the associated slide for regulating the projection thereof from said block, said adjusting means each including a hand wheel for actuation thereof, the diameter of said wheels being greater than the thickness of blocks and said blocks being alternately reversely arranged so that the bores in adjacent blocks are located at opposite sides of their associated channels, whereby to prevent interference between said adjusting means.

MAHLON A. WINTER.

REFERENCES CITED

The following references are of record in the file of this patent:

UNITED STATES PATENTS

| Number | Name | Date |
|---|---|---|
| 1,525,052 | Spotz | Feb. 3, 1925 |
| 1,853,714 | Allen | Apr. 12, 1932 |
| 2,344,091 | Kirk | Mar. 14, 1944 |
| 2,366,573 | Swallow | Jan. 2, 1945 |

FOREIGN PATENTS

| Number | Country | Date |
|---|---|---|
| 395,674 | Great Britain | of 1933 |
| 681,511 | Germany | Sept. 25, 1939 |